United States Patent
Gopalakrishnan

(10) Patent No.: US 6,330,098 B1
(45) Date of Patent: *Dec. 11, 2001

(54) APPARATUS FOR EXTERNALLY MODULATING TWO OPTICAL CHANNELS AT THE SAME TIME

(75) Inventor: Ganesh K. Gopalakrishnan, Bethesda, MD (US)

(73) Assignee: Codeon Corporation, Columbia, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,980

(22) Filed: Oct. 6, 1999

(51) Int. Cl.[7] .............................. G02F 1/03; G02F 1/035; H04J 14/02; G02B 6/26

(52) U.S. Cl. .................... 359/254; 359/124; 359/245; 385/2; 385/40

(58) Field of Search ............................ 359/124, 115, 359/127, 128, 180, 181, 183, 188, 237, 238, 239, 245, 254, 276, 279; 385/2, 3, 14, 40, 45

(56) References Cited

U.S. PATENT DOCUMENTS

| | | | |
|---|---|---|---|
| 5,074,631 | 12/1991 | Hamano et al. | 385/3 |
| 5,101,450 | 3/1992 | Olshansky | 385/3 |
| 5,303,079 | 4/1994 | Gnauck et al. | 359/188 |
| 5,408,544 | 4/1995 | Seino | 385/3 |
| 5,787,211 | 7/1998 | Gopalakrishnan | 385/2 |
| 5,812,306 | 9/1998 | Mizrahi | 359/341 |

OTHER PUBLICATIONS

A. H. Gnauck et al., "Dispersion Penalty Reduction Using an Optical Modulator with Adjustable Chirp," IEEE Photonics Technology Letters, vol. 3, No. 10, Oct. 1991, pp. 916–918.

G. K. Gopalakrishnan et al., "Performance and Modeling of Broadband $LiNbO_3$ Traveling Wave Optical Intensity Modulators," Jour. Of Lightwave Technology, vol. 12, No. 10, Oct. 1994, pp. 1807–1819.

G. K. Gopalakrishnan et al., "Performance and Modeling of Resonantly Enhanced $LiNbO_3$ Modulators for Low–Loss Analog Fiber–Optic Links," IEEE Trans. On Microwave Theory and Techniques, vol. 42, No. 12, Dec. 1994, pp. 2650–2656.

P. Jiang et al. "$LiNbO_3$ Mach–Zehnder Modulators with Fixed Negative–Chirp," IEEE Photonics Technology Letters, vol. 8, No. 10, Oct. 1996, pp. 1319–1321.

G. H. Smith et al., "Overcoming Chromatic–Dispersion Effects in Fiber–Wireless Systems Incorporating External Modulators," IEEE Trans. On Microwave Theory and Techniques, vol. 45, No. 8, Aug. 1997, pp. 1410–1415.

*Primary Examiner*—Georgia Epps
*Assistant Examiner*—David N. Spector
(74) *Attorney, Agent, or Firm*—Morgan, Lewis & Bockius LLP

(57) ABSTRACT

A Mach-Zehnder interferometer-type modulator for externally modulating two independent optical signals with first and second electrical signals, the modulator includes a first electrode receiving the first electrical signal, a second electrode receiving the second electrical signal, a first optical signal path co-propagating the first optical signal with the first electrical signal and counter-propagating the first optical signal with the second electrical signal, to generate a first modulated optical signal corresponding to the first optical signal modulated with the first electrical signal, and a second optical signal path co-propagating the second optical signal with the second electrical signal and counter-propagating the second optical signal with the second electrical signal, to generate a second modulated optical signal corresponding to the second optical signal modulated with the second electrical signal.

43 Claims, 3 Drawing Sheets

APPARATUS FOR EXTERNALLY MODULATING TWO OPTICAL CHANNELS AT THE SAME TIME

BACKGROUND OF THE INVENTION

1. Field of the Invention

The present invention relates to an optical modulator, and more particularly, to an external optical modulator. Although the present invention is suitable for a wide scope of application, it is particularly suitable for simultaneously modulating two independent optical channels in one modulator.

2. Discussion of the Related Art

An external optical modulator (EOM) is an important component in wavelength division multiplexed (WDM) optical transmission systems. In such systems, an electrical signal representing the information to be transmitted is applied to the EOM, which then modulates a continuous wave (CW) laser beam that propagates the modulated light through the transmission system. One of the advantages of external optical modulation over directly modulating the laser is that data can be transmitted relatively chirp-free, thereby reducing errors in long distance transmission. Chirp is an instantaneous change in optical frequency, which accompanies the process of directly modulating the laser diode. Chirp interacts with the dispersion profile of the transmission fiber to severely limit the distance over which error-free data transmission is possible. External optical modulators can be designed with little or no chirp, enabling a much higher transmission distance than can be obtained with direct modulation.

In a conventional optical modulator, the dual electrode design concept was developed so that the data and its complement can be separately applied to the two electrodes of the dual electrode modulator. This is also known as differential driving. By adjusting the relative amplitudes of the data and its complement the chirp parameter of the modulator can be fixed to any desired value between − and +.

Conventionally, externally modulated WDM transmission systems have employed one EOM per optical channel. Further, the EOM is one of the more expensive optical components employed in the system. It would therefore be advantageous to provide an apparatus wherein two or more optical channels can be modulated with one EOM.

SUMMARY OF THE INVENTION

Accordingly, the present invention is directed to an external modulator that substantially obviates one or more of problems due to limitations and disadvantages of the related art.

Another object of the present invention is to provide an apparatus that allows for the operation of two optical channels on one modulator.

A further object of the present invention is to provide an economically more feasible apparatus for modulating more than one optical channels in a single modulator.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a Mach-Zehnder interferometer-type modulator for externally modulating two independent optical signals with first and second electrical signals, the modulator includes a first electrode receiving the first electrical signal, a second electrode receiving the second electrical signal, a first optical signal path co-propagating the first optical signal with the first electrical signal and counter-propagating the first optical signal with the second electrical signal, to generate a first modulated optical signal corresponding to the first optical signal modulated with the first electrical signal, and a second optical signal path co-propagating the second optical signal with the second electrical signal and counter-propagating the second optical signal with the first electrical signal, to generate a second modulated optical signal corresponding to the second optical signal modulated with the second electrical signal.

In another aspect of the present invention, a Mach-Zehnder interferometer-type modulator for externally modulating first and second optical signals with first and second electrical signals, the modulator includes a first electrode receiving the first electrical signal, a second electrode receiving the second electrical signal, a first laser, coupled to the first optical signal path, for generating the first optical signal, a second laser, coupled to the second optical signal path, for generating the second optical signal, a first optical port receiving the first optical signal, a second optical port receiving the second optical signal, a first terminating resistor coupled to a second end of the first dual electrode, and a second terminating resistor coupled to a second end of the second dual electrode, wherein the first and second terminating resistors are disposed diagonally to each other.

In another aspect of the present invention, a Mach-Zehnder interferometer-type modulator for externally modulating first and second optical signals with first and second electrical signals, respectively, the modulator includes a first dual electrode having first and second ends, the first end receiving a first electrical signal for propagation in a first direction and the second end receiving a second electrical signal for propagation in a second direction opposite to the first direction, a second dual electrode substantially isolated from the first dual electrode and having first and second ends, the first end receiving a third electrical signal for propagation in a third direction and the second end receiving a fourth electrical signal for propagation in a fourth direction opposite to the third direction, a first optical signal path for propagating a first optical signal in the first direction and the third direction to modulate the first optical signal with the first electrical signal and the third electrical signal, and a second optical signal path for propagating a second optical signal in the second direction and the fourth direction to modulate the second optical signal with the second electrical signal and the fourth electrical signal.

In a further aspect of the present invention, a wavelength division multiplexed optical transmission system, comprising a Mach-Zehnder interferometer-type modulator for externally modulating two independent optical signals with first and second electrical signals, the modulator includes a first electrode receiving the first electrical signal, a second electrode receiving the second electrical signal, a first optical signal path co-propagating the first optical signal with the first electrical signal and counter-propagating the first optical signal with the second electrical signal, to generate a first modulated optical signal corresponding to the first optical signal modulated with the first electrical signal, and a second optical signal path co-propagating the second optical signal with the second electrical signal and counter-propagating the second optical signal with the second electrical signal, to generate a second modulated optical signal corresponding to the second optical signal modulated with the second electrical signal.

It is to be understood that both the foregoing general description and the following detailed description are exemplary and explanatory only are not restrictive of the invention, as claimed.

BRIEF DESCRIPTION OF THE DRAWINGS

The accompanying drawings, which are included to provide a further understanding of the invention and are incorporated in and constitute a part of this application, illustrate several embodiments of the invention and together with the description, serve to explain the principle of the invention.

In the drawings.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

Figure 1:
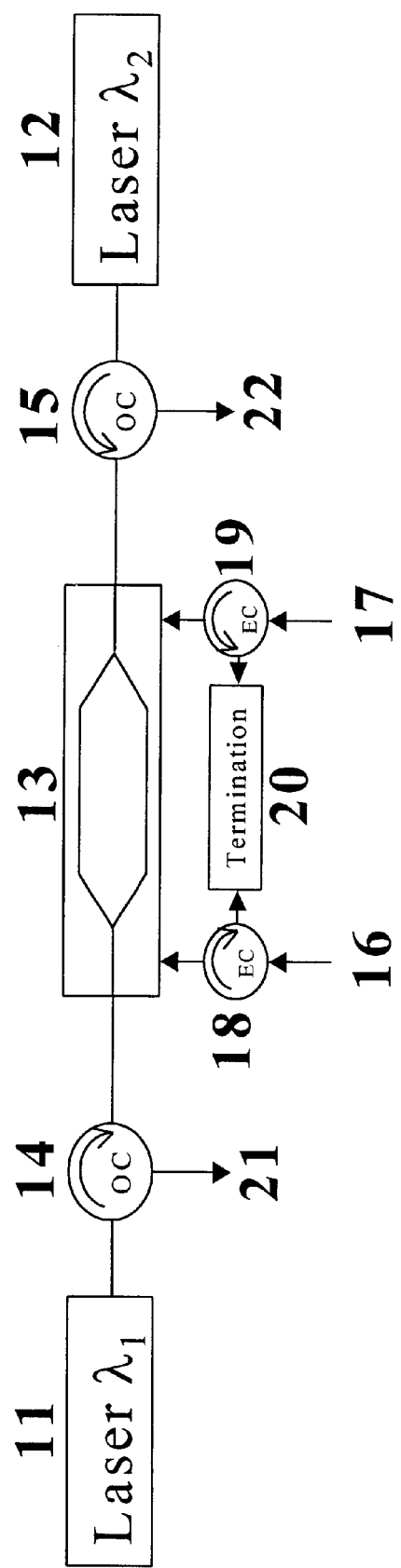
FIG. 1 is a schematic view of a modulating apparatus in accordance with a first embodiment of the present invention.

Initially referring to FIG. 1, which represents a microwave subcarrier-wavelength division multiplexed (SC-WDM) transmission system, a first embodiment of the present invention includes first and second lasers 11 and 12 generating lights of continuous wavelengths $\lambda_1$ and $\lambda_2$ that represent first and second optical channels and a Mach-Zehnder type modulator 13. A first optical circulator 14 is coupled between the first laser 11 and the Mach-Zehnder type modulator 13. A second optical circulator 15 is provided between the second laser 12 and the Mach-Zehnder type modulator 13. Also, first and second RF sources generating electrical signals that represent subcarrier channels 16 and 17 for modulating first and second optical channels $\lambda_1$ and $\lambda_2$ are provided to the Mach-Zehnder type modulator 13. Each of the subcarrier channels 16 and 17 may include one or more channels of electrical signals. A first electrical circulator 18 is coupled with the first subcarrier channels 16 and the Mach-Zehnder type modulator 13. A second electrical circulator 19 is positioned between the second subcarrier channels 17 and the Mach-Zehnder type modulator 13. A terminating resistor 20 is provided between the first and second electrical circulators 18 and 19 for suppressing counter-propagating electrical signals with respect to the optical channels. Alternatively, separate terminating resistors may be attached to each of the first and second electrical circulators 18 and 19. A modulated first optical channel 22 is output from the second optical circulator 15 while a modulated second optical channel 21 is output from the first optical circulator 14. The first and second optical circulators 14 and 15 also provide optical isolation between the first and second optical channels 11 and 12.

Operation of the apparatus in accordance with the first embodiment is described as follows. In the Mach-Zehnder type modulator 13, the electrical signals from the subcarrier channels 16 and 17 to be transmitted are co-propagated with a continuous wave optical signal from the first and second lasers 11 and 12 to achieve an intensity modulation in the optical domain. In this mode of operation, if the electrical and optical signals are made to travel at nearly the same velocity, such as very high bandwidth ($\geq 40$ GHz) operation, data transmission is limited only by electrode loss of the device.

In contrast, if the electrical signals are made to counter-propagate with the optical signals, the electrical-optical interaction efficiency is degraded. Thus, significant nulls are introduced in the optical response as a function of frequency. Typically, at frequencies above about 2 GHz, the counter-propagating frequency response is about 15 to 40 dB below the co-propagating response. The frequency response and the magnitude and position of the nulls in the counter-propagating mode of operation are dependent on frequency and device design. Parameters relating to device design that affect the counter-propagating response of the modulator include the length of the device and the electrical effective index of the propagating electrical mode supported by the modulator. The electrical effective index is the ratio of the velocity of light in free space to the velocity of light in the electrode structure.

With respect to FIG. 1, lasers 11 and 12 generate two independent uncorrelated laser sources which are applied to two optical ports (for example, input and output fibers and not shown in drawings) of the modulator 13. The first subcarrier channels 16, and the second subcarrier channels 17 are electrical signals applied to the first and second electrical ports of modulator 13 for modulating optical wavelengths $\lambda_1$ and $\lambda_2$, respectively. The electrical signals may be coupled to the modulator using, for example, RF connectors. The optical circulators 14 and 15 separate out the optical channels 11 and 12 after modulation. The electrical circulators 18 and 19 provide electrical isolation between the first and second subcarriers channels 16 and 17 by directing the counter-propagating electrical subcarrier channels to the terminating resistor 20.

The first subcarrier channels 16 for modulation on $\lambda_1$ counter-propagates with the optical wavelength $\lambda_2$. Hence, it weakly interacts with $\lambda_2$. Similarly, since the second subcarrier channels 17 for modulation on $\lambda_2$ counter-propagates with the optical wavelength $\lambda_2$, it weakly interacts with $\lambda_1$. By judicious choice of subcarrier frequencies, significant suppression of cross-interference of $\lambda_1$ subcarrier channel in $\lambda_2$, and vice-versa can be obtained. For example, the subcarrier frequencies may be in the range above 2 Ghz for some equipment. Once a modulator is designed and fabricated, the frequency response can be measured for the cases of: (1) co-propagating electrical and optical signals, and (2) counter-propagating electrical and optical signals. The counter-propagating response will typically contain several nulls as a function of frequency. By choosing the frequency of the subcarrier to correspond to a null position in the counter-propagating response, the interaction of this subcarrier channel with the counter-propagating optical channel is suppressed. The degree of suppression achievable is reflected by the measured counter-propagating response of the modulator. Interaction suppression in the range of 15–40 dB is possible in practice.

Figure 2:
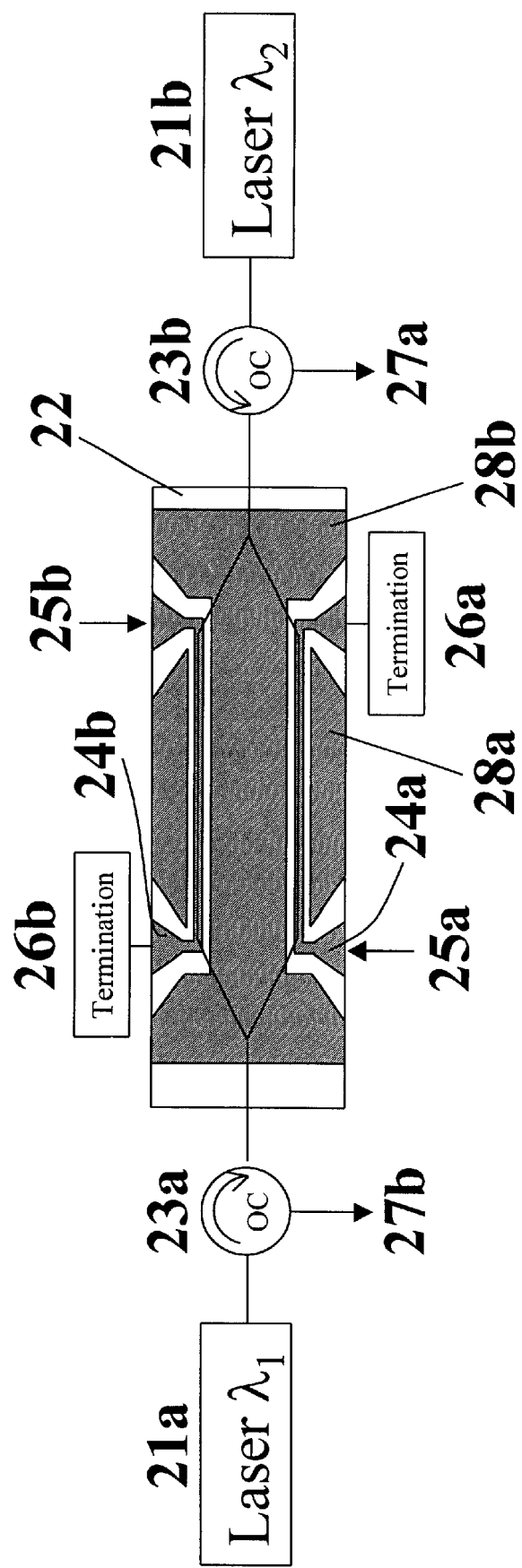
FIG. 2 is a schematic view of a modulating apparatus in accordance with a second embodiment of the present invention.

Alternately, electrical isolation between the two subcarrier channels can be obtained with the modulator design of the second embodiment of the present invention, as shown in FIG. 2. In this embodiment, two independent electrodes 24a and 24b are formed on a Mach-Zehnder type modulator 22 and separated from each other. In conventional dual electrode designs, the electrical and optical signals always co-propagate with each other. Thus, the two electrical driving signals are applied such that they propagate in the same direction as the single optical signal. Therefore, terminating resistors are placed at the end of the each electrode to be positioned diametrically opposite to each other.

In contrast, in the second embodiment of the present invention shown in FIG. 2, terminating resistors 26a and 26b are placed diagonally opposite to each other. The implementation of two independent optical channels are modulated on one modulator in the configuration shown in FIG. 2.

Referring to FIG. 2, the second embodiment of the present invention includes first and second lasers 21a and 21b that produce continuous lights of wavelengths $\lambda_1$ and $\lambda_2$ for first and second optical channels and a Mach-Zehnder modulator 22. A first optical circulator 23a is disposed between the first laser 21a and the Mach-Zehnder modulator 22. A second optical circulator 23b is disposed between the second laser 21b and the Mach-Zehnder modulator 22. First and second electrical signals 25a and 25b, typically RF signals, are applied to modulate the first and second optical channels. Unlike the first embodiment, electrical circulators are not required in the second embodiment as shown in FIG. 2. A dual electrode 24a and 24b is formed on the Mach-Zehnder modulator 22 and separated from each other. One end of each electrode is connected to a terminating resistor 26a and 26b while the other end of each electrode receives one of the first and second electrical signals 25a and 25b. Dark areas 28a and 28b other than the dual electrode 28a and 28b form ground electrodes.

As shown in FIG. 2, a first subcarrier signal 25a for modulation on optical signal $\lambda_1$ counter-propagate with optical signal $\lambda_2$, so that it interacts weakly with $\lambda_2$. For example, interaction may be limited to the range of 15–40 dB. Of course, the level of interaction acceptable depends on the particular application. Similarly, a second subcarrier channel 25b for modulation on optical signal $\lambda_2$ counter-propagate with optical signal $\lambda_1$, so that it interacts weakly with $\lambda_1$, By judicious choice of the subcarrier frequencies, cross-interference of $\lambda_1$, subcarrier channel in $\lambda_2$, and vice-versa are significantly reduced.

In this second embodiment, since the two driving electrodes 24a and 24b are separate and independent from each other, electrical isolation between the two groups of subcarrier channels is intrinsic. Thus, the electrical circulators shown in the first embodiment of FIG. 1 are not required.

Conventionally, the dual electrode designs were only to allow for the modulation of one optical channel on each modulator. Thus, even though the two electrodes were driven with independent drivers, the data applied to these electrodes was derived from the same data stream. Unlike the conventional dual electrode design, there are two optical channels on one modulator as shown in FIG. 2, so that the data to be transmitted maybe derived from two independent data streams.

Figure 3:
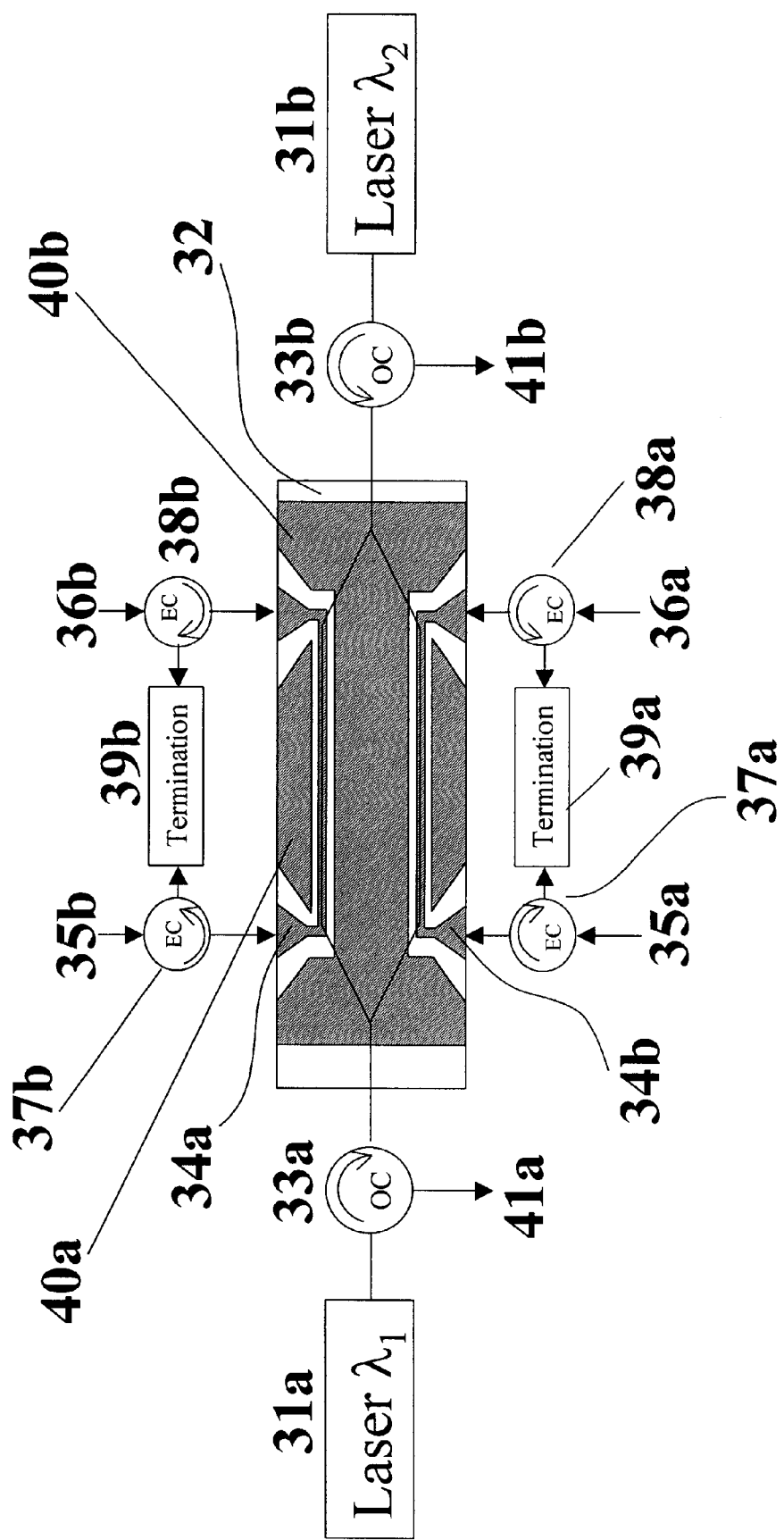
FIG. 3 is schematic view of a modulating apparatus in accordance with a third embodiment of the present invention.

In FIG. 3, a third embodiment of two optical channels on one differentially driven modulator with adjustable chirp is demonstrated. The third embodiment of the present invention includes first and second continuous wave lasers 31a and 31b that generate laser light having wavelengths $\lambda_1$ and $\lambda_2$ for two optical channels and a Mach-Zehnder type modulator 32. First and second optical circulators 33a and 33b are disposed between the first laser 31a and the Mach-Zehnder type modulator 32 and the second laser 31b and the Mach-Zehnder type modulator 32, respectively.

Subcarrier channels 35a and 35b are applied to electrical circulators 37a and 37b, respectively. Subcarrier channels 36a and 36b are applied to electrical circulators 36a and 36b. Subcarrier channels 35a may be derived from the same source as subcarrier channels 35b. Likewise, subcarrier channels 36a and 36b may be derived from the same source. Prior to application to the electrical circulators, a weighting factor is applied to each of the subcarrier channels 35a, 35b, 36a, and 36b. The weighting factor for channels 35a and 35b is the ratio of the peak-to-peak drive voltages applied to these channels. Similarly, the weighting factor for channels 36a and 36b is the ratio of the peak-to-peak drive voltages applied to these channels. The weighting factor determines a chirp parameter of the particular optical wavelength channel.

The weighting factor of the subcarrier channels for modulation on $\lambda_1$ may be designated as $\alpha$, and the weighting factor of the subcarrier channels for modulation on $\lambda_2$ may be designated as $\beta$, where $0 \leq |\alpha| \leq$ and $0 \leq |\beta| \leq$. Specifically, subcarrier signals 35a and 35b for modulation on $\lambda_1$ have a weighing factor of $\alpha$. As noted above, subcarrier signals 35a and 35b may be derived from the same source, e.g., the same data stream. Similarly, subcarrier signals 36a and 36b for modulation on $\lambda_2$ have a weighting factor of $\beta$ are also derived from a common source, e.g., the same data stream, which may be different from the source intended for modulation on $\lambda_1$.

The magnitude and sign of the weighting factors determine the chirp parameter of the modulator. For example, when $\alpha$ and $\beta$ are $-0.5$, complementary signals of equal amplitude are applied to each electrode 34a and 34b of the modulator 32. This condition corresponds to differential driving with near zero chirp. By varying the values of $\alpha$ and $\beta$, different chirp parameters can be obtained.

The weighting factors may be implemented, for example, by adjusting the amplitudes and phases of the subcarrier channels 35a and 35b and the subcarrier channels 36a and 36b. Alternatively or in addition, an electrical splitter may be used to implement the amplitude weighing factors. For example, an electrical splitter may split an electrical signal into subcarrier channels 35a and subcarrier channels 35b, with the split ratio of the splitter determining the weighting factor.

Similar to the previous embodiments, optical circulators 33a and 33b separate out the optical signals from the lasers 31a and 31b from the optical signals of outputs 41a and 41b. Also, electrical circulators 37a, 37b, 38a, and 37b provide the necessary isolation between subcarrier signals 35a and 35b for modulation on the first optical signal $\lambda_1$ and subcarrier signals 36a and 36b for modulation on the second optical signal $\lambda_2$. Between the electrical circulators 37a and 38a, a terminating resistor 39a is commonly connected to suppress counter-propagating electrical signals with respect to the optical signals. Similarly, another terminating resistor 39b is positioned between the electrical isolators 37b and 38b to suppress counter-propagating electrical signals with respect to the optical signals. Alternatively, separate terminating resistors may be coupled to each of electrical isolators 37a and 37b and/or electrical isolators 38a and 38b.

As previously described, one of the advantages of the present invention is that two independent optical channels are modulated in one modulator. The present invention has various applications in WDM transmission systems.

It will be apparent to those skilled in the art that various modification and variations can be made in the apparatus for of the present invention without departing from the scope or spirit of the inventions. For example, one or more of the optical circulators may be replaced by a directional coupler or other device capable of providing isolation. Similarly, one or more of the electrical circulators may be replaced, for example, by a passive device capable of providing isolation. Thus, it is intended that the present invention covers the modifications and variations of this invention provided they come within the scope of the appended claims and their equivalents.

What is claimed is:

1. A Mach-Zehnder interferometer-type modulator for externally amplitude modulating two independent optical signals with first and second electrical signals, the modulator comprising:

a first electrode receiving the first electrical signal;

a second electrode receiving the second electrical signal;

a first optical signal path co-propagating the first optical signal with the first electrical signal and counter-propagating the first optical signal with the second electrical signal, to generate a first modulated optical signal corresponding to the first optical signal modulated with the first electrical signal; and a second optical signal path co-propagating the second optical signal with the second electrical signal and counter-propagating the second optical signal with the first electrical signal, to generate a second modulated optical signal corresponding to the second optical signal modulated with the second electrical signal.

2. The apparatus according to claim 1, further comprising, a first laser, coupled to the first optical signal path, for generating the first optical signal, and a second laser, coupled to the second optical signal path, for generating the second optical signal.

3. The apparatus according to claim 2, further comprising, a first optical circulator between the first laser and the first optical signal path for providing optical isolation between the first laser signal and the second modulated optical signal, and a second optical circulator between the second laser and the second optical signal path for providing optical isolation between the second optical signal and the first modulated optical signal.

4. The apparatus according to claim 3, wherein the first optical circulator acts as an output for the second modulated optical signal and the second circulator acts as an output for the first modulated optical signal.

5. The apparatus according to claim 2, further comprising, a directional coupler between the first laser and the first optical signal path for providing optical isolation between the first laser signal and the second modulated optical signal.

6. The apparatus according to claim 1, further comprising, a first electrical circulator coupled to the first electrode, and a second electrical circulator coupled to the second electrode, wherein the first and second electrical circulators provide electrical isolation for the first and second electrical signals.

7. The apparatus according to claim 6, further comprising a terminating resistor coupled to each of the first and second electrical circulators for suppressing counter-propagating electrical signals with respect to the first and second optical signals.

8. The apparatus according to claim 1, where in the first optical signal and the second electrical signal weakly interact with each other.

9. The apparatus according to claim 1, wherein the first and second electrical signals have frequencies above 2 GHz.

10. The apparatus according to claim 1, wherein the second optical signal and the first electrical signal weakly interact with each other.

11. The apparatus according to claim 1, wherein each of the first and second optical signals are generated by a continuous wave mode laser.

12. A phase modulator for externally modulating two independent optical signals with first and second electrical signals, the modulator comprising:

a first electrode receiving the first electrical signal;

a second electrode receiving the second electrical signal;

a first optical signal path co-propagating the first optical signal with the first electrical signal and counter-propagating the first optical signal with the second electrical signal, to generate a first modulated optical signal corresponding to the first optical signal modulated with the first electrical signal; and a second optical signal path co-propagating the second optical signal with the second electrical signal and counter-propagating the second optical signal with the first electrical signal, to generate a second modulated optical signal corresponding to the second optical signal modulated with the second electrical signal.

13. A Mach-Zehnder interferometer-type modulator for externally amplitude modulating first and second optical signals with first and second electrical signals, the modulator comprising:

a first electrode receiving the first electrical signal;

a second electrode receiving the second electrical signal;

a first laser, coupled to a first optical signal path, for generating the first optical signal;

a second laser, coupled to a second optical signal path, for generating the second optical signal;

a first optical port receiving the first optical signal;

a second optical port receiving the second optical signal;

a first terminating resistor coupled to a second end of the first electrode; and a second terminating resistor coupled to a second end of the second electrode, wherein the first and second terminating resistors are disposed diagonally to each other.

14. The apparatus according to claim 13, further comprising, a first optical circulator between the first optical signal and the first optical port for providing optical isolation between the first optical signal and a modulated second optical signal, and a second optical circulator between the second signal and the second optical port for providing optical isolation between the second optical signal and a modulated first optical signal.

15. The apparatus according to claim 14, wherein the first optical circulator acts as an output for a modulated second optical signal and the second circulator acts as an output for a modulated first optical signal.

16. The apparatus according to claim 13, further comprising, a directional coupler between the first optical signal and the first optical port for providing optical isolation between the first optical signal and a modulated second optical signal.

17. The apparatus according to claim 13, wherein the first optical signal and the first electrical signal co-propagate with each other.

18. The apparatus according to claim 13, wherein the first and second optical signals are generated by a continuous wave mode laser.

19. The apparatus according to claim 13, wherein the first optical signal and the second electrical signal counter-propagate with each other, wherein the first optical signal and the second electrical signal weakly interact with each other.

20. The apparatus according to claim 19, wherein the first and second electrical signals have frequencies above 2 GHz.

21. A Mach-Zehnder interferometer-type modulator for externally amplitude modulating first and second optical signals with first and second electrical signals, respectively, the modulator comprising:
   a first dual electrode having first and second ends, the first end receiving a first electrical signal for propagation in a first direction and the second end receiving a second electrical signal for propagation in a second direction opposite to the first direction;
   a second dual electrode substantially isolated from the first dual electrode and having first and second ends, the first end receiving a third electrical signal for propagation in a third direction and the second end receiving a fourth electrical signal for propagation in a fourth direction opposite to the third direction;
   a first optical signal path for propagating a first optical signal in the first direction and the third direction to modulate the first optical signal with the first electrical signal and the third electrical signal; and
   a second optical signal path for propagating a second optical signal in the second direction and the fourth direction to modulate the second optical signal with the second electrical signal and the fourth electrical signal.

22. The apparatus according to claim 21, wherein the first direction and the third direction are the same and the second direction and the fourth direction are the same.

23. The apparatus according to claim 21, wherein the first electrical signal is the complement of the third electrical signal, and the second electrical signal and the fourth electrical signal are complementary.

24. The apparatus according to claim 21, wherein:
   the first and third electrical signals are derived from the same data stream and a ratio of the peak-to-peak drive voltage of the first electrical signal and the peak-to-peak drive voltage of the third electrical signal is $\alpha$, where $0 \leq |\alpha| \leq \infty$; and
   the second and fourth electrical signals are derived from the same data stream and a ratio of the peak-to-peak drive voltage of the second electrical signal and the peak-to-peak drive voltage of the fourth electrical signal is $\beta$, $0 \leq |\beta| \leq \infty$.

25. The apparatus of claim 21, further comprising:
   a first electrical circulator coupled to the first end of the first dual electrode;
   a second electrical circulator coupled to the second end of the first dual electrode;
   a third electrical circulator coupled to the first end of the second dual electrode; and
   a fourth electrical circulator coupled to the second end of the second dual electrode.

26. The apparatus of claim 25, further comprising:
   first and second terminating resistors coupled to the first and second electrical circulators; and
   third and fourth terminating resistors coupled to the third and fourth electrical circulators.

27. The apparatus according to claim 21, further comprising:
   a first laser coupled to the first optical signal path for generating the first optical signal; and
   a second laser coupled to the second optical signal path for generating the second optical signal.

28. The apparatus according to claim 27, further comprising:
   a first optical circulator coupled between the first laser and the first optical signal path, wherein the first optical circulator acts as an output for the modulated second optical signal; and
   a second optical circulator coupled between the second laser and the second optical signal path, wherein the second optical circulator acts as an output for the modulated first optical signal.

29. The apparatus according to claim 27, further comprising:
   a first directional coupler coupled between the first laser and the first optical signal path, wherein the first directional coupler acts as an output for the modulated second optical signal; and
   a second directional coupler coupled between the second laser and the second optical signal path, wherein the second directional coupler acts as an output for the modulated first optical signal.

30. The apparatus according to claim 21, wherein the first, second, third, and fourth second electrical signals have frequencies above 2 GHz.

31. A phase modulator for externally modulating first and second optical signals with first and second electrical signals, respectively, the modulator comprising:
   a first dual electrode having first and second ends, the first end receiving a first electrical signal for propagation in a first direction and the second end receiving a second electrical signal for propagation in a second direction opposite to the first direction;
   a second dual electrode substantially isolated from the first dual electrode and having first and second ends, the first end receiving a third electrical signal for propagation in a third direction and the second end receiving a fourth electrical signal for propagation in a fourth direction opposite to the third direction;
   a first optical signal path for propagating a first optical signal in the first direction and the third direction to modulate the first optical signal with the first electrical signal and the third electrical signal; and
   a second optical signal path for propagating a second optical signal in the second direction and the fourth direction to modulate the second optical signal with the second electrical signal and the fourth electrical signal.

32. A wavelength division multiplexed optical transmission system, comprising a Mach-Zehnder interferometer-type modulator for externally modulating two independent optical signals with first and second electrical signals, the modulator including:
   a first electrode receiving the first electrical signal;
   a second electrode receiving the second electrical signal;
   a first optical signal path co-propagating the first optical signal with the first electrical signal and counter-propagating the first optical signal with the second electrical signal, to generate a first modulated optical signal corresponding to the first optical signal modulated with the first electrical signal; and
   a second optical signal path co-propagating the second optical signal with the second electrical signal and counter-propagating the second optical signal with the first electrical signal, to generate a second modulated optical signal corresponding to the second optical signal modulated with the second electrical signal.

33. The apparatus according to claim 32, further comprising,
a first laser, coupled to the first optical signal path, for generating the first optical signal, and
a second laser, coupled to the second optical signal path, for generating the second optical signal.

34. The apparatus according to claim 33, further comprising,
a first optical circulator between the first laser and the first optical signal path for providing optical isolation between the first laser signal and the second modulated optical signal, and
a second optical circulator between the second laser and the second optical signal path for providing optical isolation between the second optical signal and the first modulated optical signal.

35. The apparatus according to claim 34, wherein the first optical circulator acts as an output for the second modulated optical signal and the second circulator acts as an output for the first modulated optical signal.

36. The apparatus according to claim 33, further comprising,
a first directional coupler between the first laser and the first optical signal path for providing optical isolation between the first laser signal and the second modulated optical signal, and
a second directional coupler between the second laser and the second optical signal path for providing optical isolation between the second optical signal and the first modulated optical signal.

37. The apparatus according to claim 32, further comprising,
a first electrical circulator coupled to the first electrode, and
a second electrical circulator coupled to the second electrode, wherein the first and second electrical circulators provide electrical isolation for the first and second electrical signals.

38. The apparatus according to claim 37, further comprising a terminating resistor coupled to each of the first and second electrical circulators for suppressing counter-propagating electrical signals with respect to the first and second optical signals.

39. The apparatus according to claim 32, wherein the first optical signal and the second electrical signal weakly interact with each other.

40. The apparatus according to claim 32, wherein the first and second electrical signals have frequencies above 2 GHz.

41. The apparatus according to claim 32, wherein the second optical signal and the first electrical signal weakly interact with each other.

42. The apparatus according to claim 32, wherein each of the first and second optical signals are generated by a continuous wave mode laser.

43. A wavelength division multiplexed optical transmission system, comprising a phase modulator for externally modulating two independent optical signals with first and second electrical signals, the modulator including:
a first electrode receiving the first electrical signal;
a second electrode receiving the second electrical signal;
a first optical signal path co-propagating the first optical signal with the first electrical signal and counter-propagating the first optical signal with the second electrical signal, to generate a first modulated optical signal corresponding to the first optical signal modulated with the first electrical signal; and
a second optical signal path co-propagating the second optical signal with the second electrical signal and counter-propagating the second optical signal with the first electrical signal, to generate a second modulated optical signal corresponding to the second optical signal modulated with the second electrical signal.

* * * * *